(12) United States Patent
Nakano et al.

(10) Patent No.: US 10,514,062 B2
(45) Date of Patent: Dec. 24, 2019

(54) JOURNAL DEVICE AND ROTARY MACHINE

(71) Applicant: Mitsubishi Hitachi Power Systems, Ltd., Yokohama-shi, Kanagawa (JP)

(72) Inventors: Takashi Nakano, Yokohama (JP); Tanehiro Shinohara, Tokyo (JP); Takaaki Kaikogi, Tokyo (JP); Yuichiro Waki, Yokohama (JP); Yutaka Ozawa, Takasago (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 16/086,704

(22) PCT Filed: Aug. 10, 2016

(86) PCT No.: PCT/JP2016/073668
§ 371 (c)(1),
(2) Date: Sep. 20, 2018

(87) PCT Pub. No.: WO2018/029837
PCT Pub. Date: Feb. 15, 2018

(65) Prior Publication Data
US 2019/0101155 A1    Apr. 4, 2019

(51) Int. Cl.
*F16C 17/03* (2006.01)
*F16C 33/10* (2006.01)

(52) U.S. Cl.
CPC ............ *F16C 33/103* (2013.01); *F16C 17/03* (2013.01); *F16C 33/10* (2013.01); *F16C 33/1045* (2013.01)

(58) Field of Classification Search
CPC .......... F16C 17/02; F16C 17/03; F16C 33/10; F16C 33/1025; F16C 33/1045; F16C 33/2055; F05D 2260/98
See application file for complete search history.

(56) References Cited

U.S. PATENT DOCUMENTS 5,288,156 A * 2/1994 Hori ................ G06K 15/00
                                                        358/1.2
9,217,464 B2 * 12/2015 Rudolph ............. F16C 17/03
(Continued)

FOREIGN PATENT DOCUMENTS

JP    S57-107428 A    7/1982
JP    S63-88318 A     4/1988
(Continued)

OTHER PUBLICATIONS

Notification of Transmittal of Translation of the International Preliminary Report on Patentability (Form PCT/IB/326) issued in counterpart International Application No. PCT/JP2016/073668 dated Feb. 21, 2019 with Forms PCT/IB/373, PCT/IB/338 and PCT/ISA/237, with English translation. (15 pages).
(Continued)

*Primary Examiner* — Phillip A Johnson
(74) *Attorney, Agent, or Firm* — Westerman, Hattori, Daniels & Adrian, LLP

(57) ABSTRACT

A journal bearing includes: a carrier ring having an annular shape; a first bearing pad disposed on a radially inner side of a lower half region of the carrier ring and configured to support a rotor shaft from below; a first oil-supply unit disposed immediately before and upstream of the first bearing pad; a pair of side plates disposed on both end portions of the carrier ring with respect to an axial direction, along an outer periphery of the rotor shaft, Each of the side plates includes: a first region; and a second region which is positioned above the first region, and in which a gap between an inner peripheral surface of the side plate and an outer peripheral surface of the rotor shaft is narrower than that in the first region.

11 Claims, 8 Drawing Sheets

(56) References Cited

U.S. PATENT DOCUMENTS

2010/0220944 A1    9/2010  Waki et al.
2017/0260874 A1*   9/2017  Yoshimine .............. F01D 25/18

FOREIGN PATENT DOCUMENTS

| JP | 2000-213542 A |   | 8/2000  |             |
|----|---------------|---|---------|-------------|
| JP | 2006-234147 A |   | 9/2006  |             |
| JP | 2010-203481 A |   | 9/2010  |             |
| JP | 2010203481 A  | * | 9/2010  | ...... F16C 17/03 |
| JP | 4764486 B2    |   | 9/2011  |             |
| JP | 2014196788 A  | * | 10/2014 | ...... F16C 17/03 |
| JP | 5936725 B1    |   | 6/2016  |             |
| JP | 2016-145590 A |   | 8/2016  |             |

OTHER PUBLICATIONS

International Search Report dated Nov. 22, 2016, issued in counterpart application No. PCT/JP2016/073668, with partial English translation. (12 pages).
Office Action dated Jul. 23, 2019, issued in counterpart CN application No. 201680084062.2. (7 pages).
Office Action dated Sep. 25, 2019, issued in counterpart KR application No. 10-2018-7027203, with English translation. (12 pages).

* cited by examiner

JOURNAL DEVICE AND ROTARY MACHINE

TECHNICAL FIELD

The present disclosure relates to a journal bearing and a rotary machine.

BACKGROUND ART

Generally, a journal bearing is widely known as a bearing device used in rotary machines such as steam turbines, gas turbines, blowers, and compressors.

For instance, Patent Document 1 discloses a journal bearing that includes a carrier ring, a bearing pact and an oil-supply nozzle. An oil-supply nozzle supplies lubricant oil supplied thereto to a gap between the outer peripheral surface of a rotor shaft and the inner peripheral surface of a bearing pad.

CITATION LIST

Patent Literature

Patent Document 1: JP47642186B
Patent Document 2: JP2006-234147A

SUMMARY

Problems to be Solved

The present inventors found that, in the journal bearing disclosed in Patent Document 1, it may be difficult to form an oil film having a sufficient thickness on the bearing pads. It was found that it is difficult to ensure a sufficient oil-film thickness on the bearing pads particularly in a case where the surface pressure of the rotor shaft on the healing pads is low, or in a case where the rotor shaft rotates in a low rotation speed region.

In view of the above, an object of at least one embodiment of the present invention is to provide a journal bearing and a rotary machine whereby it is possible to ensure a sufficient oil film thickness on bearing pads, and to suppress an increase in stirring resistance of the rotor shaft.

Solution to the Problems (1) A journal bearing according to at least one embodiment of the present invention includes: a carrier ring having an annular shape; a first bearing pad disposed on a radially inner side of a lower half region of the carrier ring and configured to support a rotor shaft from below; a first oil-supply unit disposed immediately before and upstream of the first bearing pad; a pair of side plates disposed on both end portions of the carrier ring with respect to an axial direction, along an outer periphery of the rotor shaft. Each of the side plates includes: a first region; and a second region which is positioned above the first region, and in which a gap between an inner peripheral surface of the side plate and an outer peripheral surface of the rotor shaft is narrower than that in the first region.

As a result of intensive researches by the present inventors, it was found that the oil film thickness at the bearing pad in the typical journal bearing disclosed in Patent Document 1 becomes insufficient due to shortage of lubricant oil that is carried over to the bearing pad. That is, in the journal bearing, lubricant oil is less likely to be carried over due to the head difference. In addition, a gap is provided between the inner peripheral surfaces of the respective side plates and the outer peripheral surface of the rotor shaft for bringing into communication the outside and a bearing interior space surrounded by the pair of side plates, and thus lubricant oil is likely to leak in the second region disposed above the first region. Thus, lubricant oil to be carried over to the bearing region reduces, which leads to shortage of lubricant oil to be supplied to the bearing pad. Particularly in a case where the surface pressure of the rotor shaft on the bearing pad is low, or in a case where the rotor shaft rotates in a low rotation speed region, a smaller amount of lubricant oil is carried over to the bearing pad, and the shortage of lubricant oil at the bearing pad is remarkable. When lubricant oil supplied to the bearing pad is insufficient, the bearing pad is not wet from the inlet and the generation region of the oil film pressure becomes narrow, which causes the oil film of the bearing pad to become thinners. Accordingly, in a case where the surface pressure of the rotor shaft on the bearing pad is low, or in a case where the rotor shaft rotates in a low rotation speed region, the shaft center trajectory of the rotor shaft may deviate from the vertical line and impair the isotropic nature of the journal bearing. On the other hand, if the oil amount of lubricant oil to be carried over to the bearing pad is excessively large, the stirring resistance of the rotor shaft may also increase.

In this regard, with the above configuration (1), lubricant oil is less likely to leak from between the rotor shaft and the side plate in the second region disposed above the first region, whereby a sufficient lubricant oil is carried over (supplied) to the first bearing pad. In this way, even in a case where the surface pressure of the rotor shaft on the first bearing pad is low, or in a case where the rotor shaft rotates in a low rotation speed region, it is possible to ensure a sufficient oil film thickness on the first bearing pad. Furthermore, excess lubricant oil is discharged from between the rotor shaft and the side plate in the first region having a wider gap than the second region, and thereby congestion of lubricant oil is prevented, which makes it possible to suppress an increase in the stirring resistance of the rotor shaft.

(2) In some embodiments, in the above configuration (1), the journal bearing further includes a second bearing pad disposed on the radially inner side of the lower half region of the carrier ring, on a downstream side of the first hearing pad with respect to a rotational direction of the rotor shaft, and configured to support the rotor shaft from below. The first region of the side plates extends in a circumferential direction at least in a positional range between the first bearing pad and the second bearing pad.

With the above configuration (2), excess lubricant oil is discharged from the positional range between the first bearing pad and the second bearing pad. In this way, it is possible to avoid congestion of lubricant oil between the first bearing pad and the second bearing pad, and suppress an increase in stirring loss of the rotor shaft.

(3) In some embodiments, in the above configuration (2), the journal bearing further includes a second oil-supply unit disposed on a circumferential-directional position between the first bearing pad and the second bearing pad.

With the above configuration (3) lubricant oil is supplied to the gap between the rotor shaft and the bearing pad from the second oil-supply unit, and lubricant oil used in the first bearing pad is replaced with the lubricant oil supplied from the second oil-supply unit. Accordingly, the second bearing pad can lubricate the rotor shaft with the lubricant oil supplied freshly from the second oil-supply unit.

(4) In some embodiments, in the above configuration (2) or (3), the journal bearing further includes a guide metal disposed on a radially inner side of an upper half region of the carrier ring, the guide metal covering an upper region of the outer peripheral surface of the rotor shaft. The first region of the side plate extends in the circumferential direction in at least one of a positional range between the guide metal and the first bearing pad or a positional range between the guide metal and the second hearing pad, in addition to the positional range between the first bearing pad and the second bearing pad.

With the above configuration (4), excess lubricant oil is discharged from the positional range between the guide metal and the first bearing pad, or from the positional range between the guide metal and the second bearing pad. In this way it is possible to avoid congestion of lubricant oil between the guide metal and the first hearing pad or between the guide metal and the second bearing pad, and suppress an increase in stirring loss of the rotor shaft.

(5) In some embodiments, in any one of the above configurations (2) to (4), the journal bearing includes a third oil-supply unit disposed downstream of the second bearing pad.

With the above configuration (5), lubricant oil is supplied to the rotor shaft from the third oil-supply unit, and lubricant oil that is carried over (supplied) to the first bearing pad increases.

(6) In some embodiments, in any one of the above configurations (1) to (5), the journal bearing includes a guide metal disposed on a radially inner side of an upper half region of the carrier ring, the guide metal covering an upper region of the outer peripheral surface of the rotor shaft. The second region of the side plate extends in a circumferential direction at least over an extending range of the guide metal.

With the above configuration (6), lubricant oil is less likely to leak from the extending range of the guide metal, which makes it possible to promote carry over of lubricant oil effectively despite a head difference.

(7) In some embodiments, in any one of the above configurations (1) to (6), at least one of the pair of side plates includes a lower half section including the first region and an upper half section including the second region, the upper half section being joined to the lower half section.

With the above configuration (7), at least one of the pair of side plates has a divided structure, and thus it is possible to improve the assembling performance of the journal bearing.

(8) In some embodiments, in the above configuration (7), the lower half section and the upper half section have an arc shape centered at the rotor shaft, and a central angle of the upper half section is equal to or greater than a central angle of the lower half section.

With the above configuration (8), lubricant oil is less likely to leak from a range equal to or greater than the lower half section, which makes it possible to promote carry over of lubricant oil effectively despite a head difference.

(9) In some embodiments, in the above configuration (8), the central angle of the upper half section is 180 degrees, the second region extends over an entire region of a circumferential-directional range of the upper half section, and the first region extends over an entire region of a circumferential-directional range of the lower half section.

With the above configuration (9), it is possible to produce side plates having gaps whose size varies between different circumferential-directional positions easily, by preparing an upper half section with a smaller gap and a lower half section with a greater gap in advance, and joining the two sections via horizontal joining surfaces.

(10) In some embodiments, in the above configuration (8), the central angle of the upper half section is greater than 180 degrees, and the upper half section is configured to be dividable into two or more sections.

With the above configuration (10), it is possible to provide an upper half section having a structure than can be divided into two pieces or more.

(11) A rotary machine according to at least one embodiment of the present invention includes: the journal bearing according to any one of the above (1) to (10); and a rotor shall supported by the journal bearing.

With the above configuration (11), it is possible ensure a sufficient oil film thickness on the bearing pads, and suppress an increase in stirring loss of the rotor shaft.

Advantageous Effects

According to at least one embodiment of the present invention, it is possible to ensure a sufficient oil film thickness on bearing pads, and it is possible to suppress an increase in the stirring resistance of the rotor shaft.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and, not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
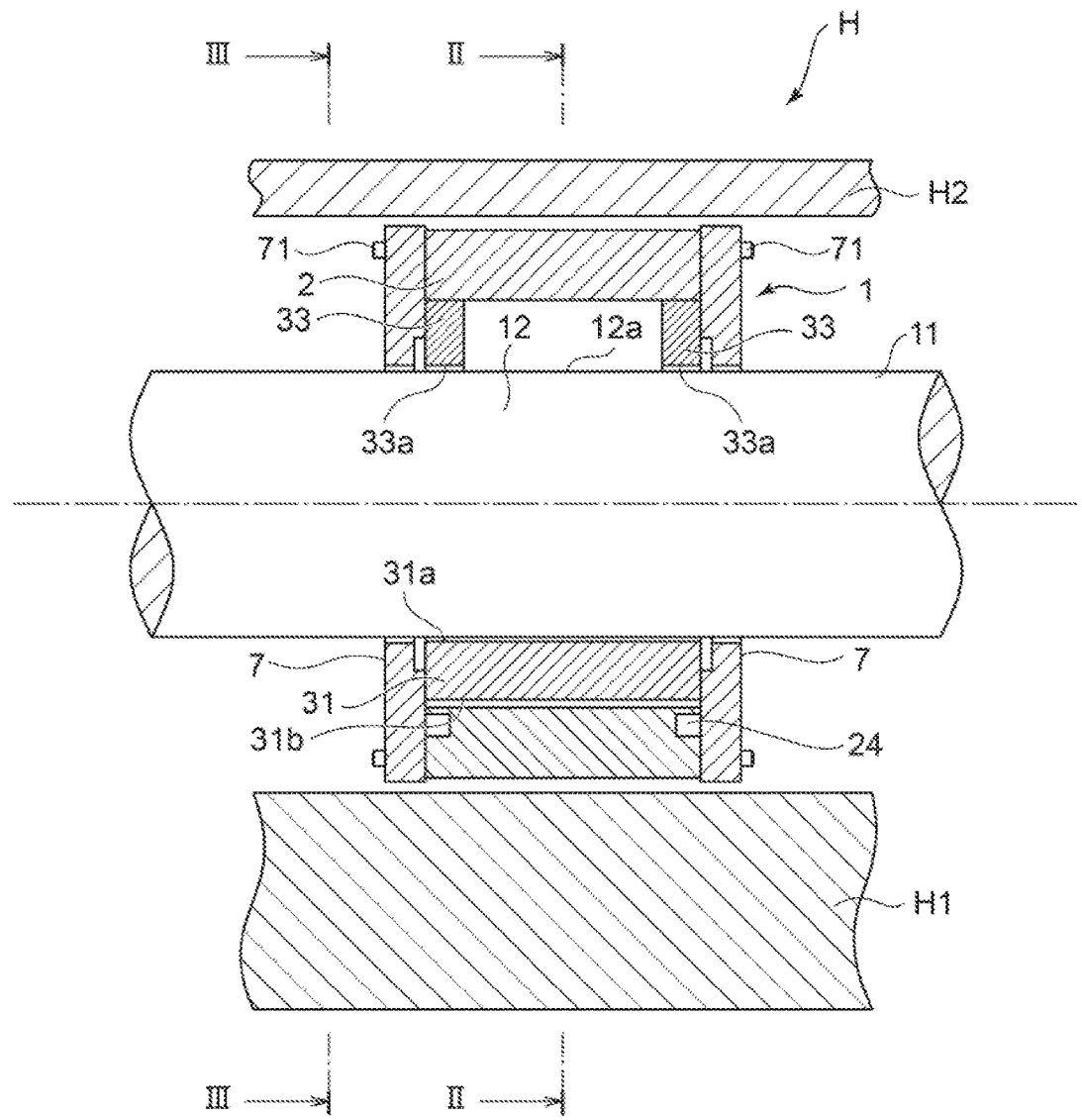
FIG. 1 is a schematic cross-sectional view of a journal bearing according to an embodiment of the present invention, the journal bearing being supported on a housing H.
Figure 2:
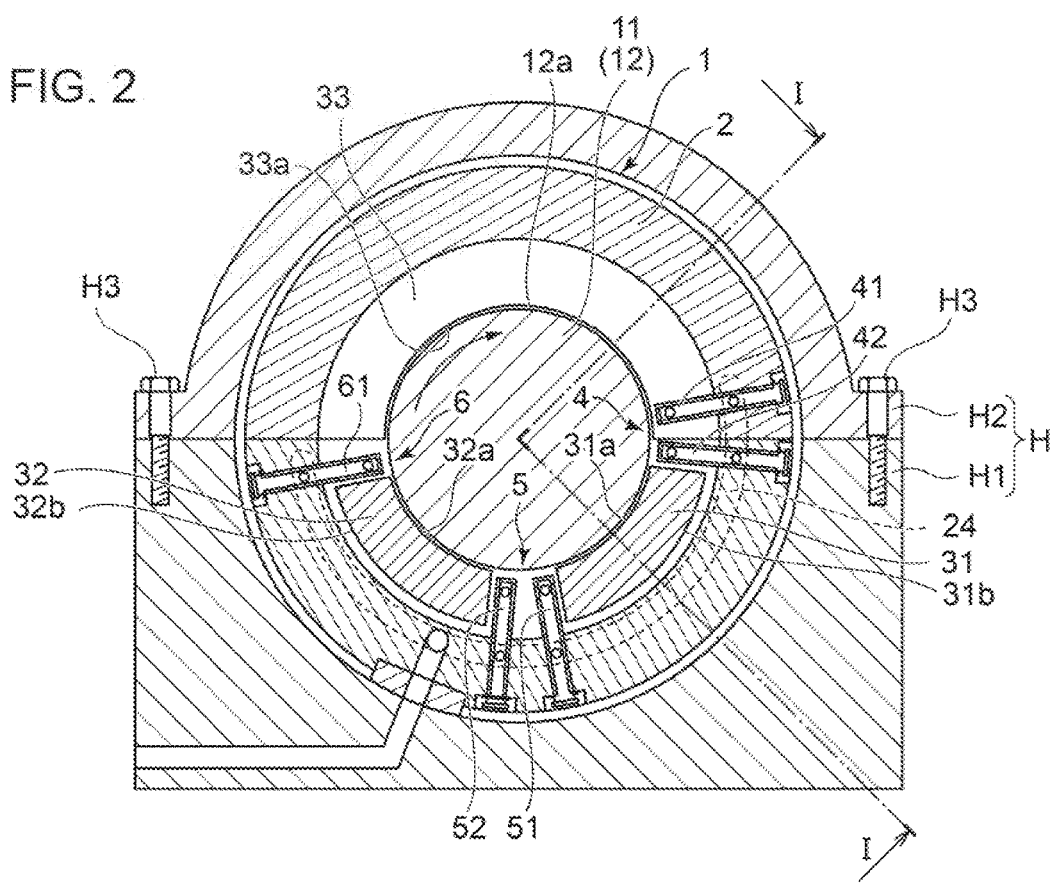
FIG. 2 is a cross-sectional view of the journal bearing shown in FIG. 1 supported on the housing, taken along line II-II.
Figure 3:
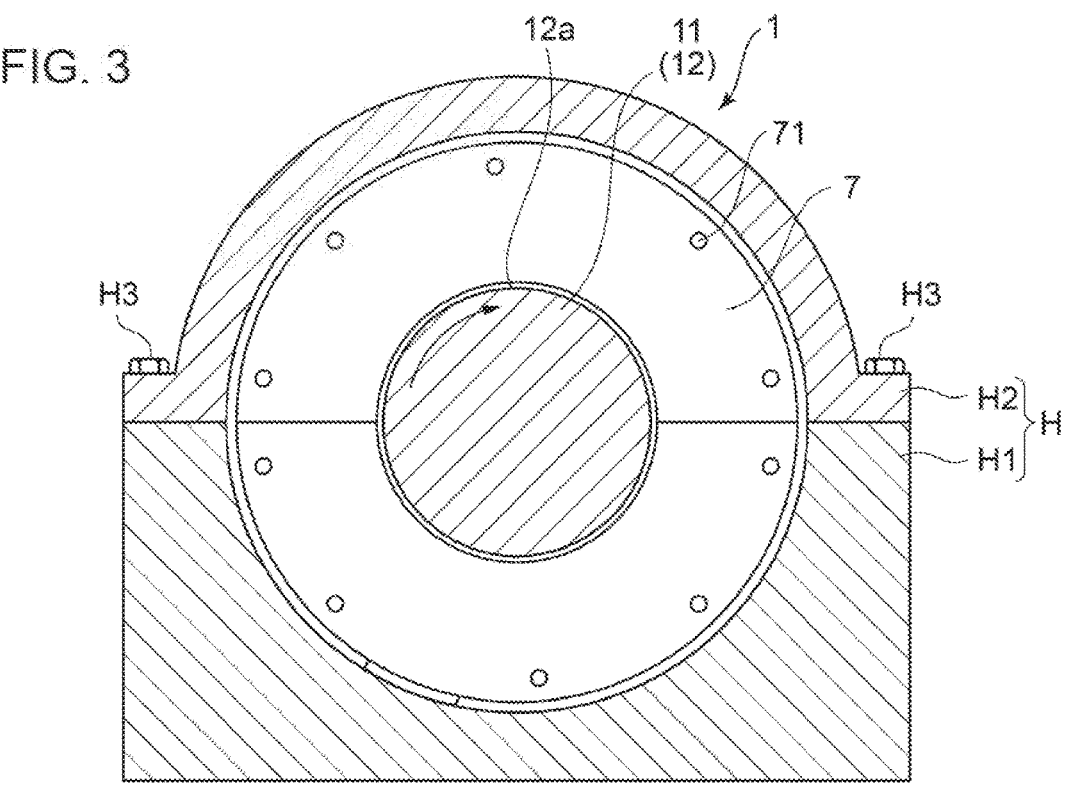
FIG. 3 is a cross-sectional view of the journal bearing shown in FIG. 1 supported on the housing, taken along line III-III.

FIG. 1 is a schematic cross-sectional view of a journal bearing 1 according to an embodiment of the present invention, the journal bearing being supported on a housing H. FIG. 2 is a cross-sectional view of the journal bearing 1 shown in FIG. 1 supported on the housing H, taken along line II-II. FIG. 3 is a cross-sectional view of the journal bearing 1 shown in FIG. 1 supported on the housing H, taken along line III-III. Further, FIGS. 5 to 8 are each a schematic view of the journal bearing 1 according to some embodiments.

FIG. 1 is also a cross-sectional view of the journal bearing 1 supported on the housing shown in FIG. 2, taken along line I-I. Further, in the following description, unless otherwise stated, with reference to the gravity direction, an upper portion with respect to the gravity direction is referred to as an upper half section and an upper half region, opposite to a lower half section and a lower half region.

In some embodiments, as shown in FIGS. 1 to 3, the journal bearing 1 is a mechanical element for rotatably supporting the rotor shaft 11, is supported by the housing H, to be mounted to a rotary machine such as a steam turbine, a gas turbine, a blower, and a compressor. As shown in FIGS. 2 and 3, the housing H includes a mount portion H1 constituting a lower half section in the gravity direction with reference to the axis of the rotor shaft 11, and a cover H2 constituting an upper half section in the gravity direction. While the journal hearing 1 according to an embodiment of the present invention is interposed between the mount portion H1 and the cover H2, the cover H2 is fastened to the mount portion H1 with a bolt H3. Accordingly, the journal bearing 1 is supported by the housing H, and the rotor shaft 11 supported rotatably by the journal bearing 1 is also supported rotatably with respect to the housing H.

In some embodiments, as shown in FIGS. 1 to 3, the journal bearing 1 includes a carrier ring 2, the first bearing pad 31, the first oil-supply unit 4, and a pair of side plates 7, 7.

As shown in FIGS. 1 and 2, the carrier ring 2 is disposed inside the housing, H, and is capable of surrounding a part of the rotor shaft 11, that is, a journal 12, in a cylindrical space. The carrier ring 2 has a cylindrical shape with a rectangular cross section, for instance.

The first bearing pad 31 is disposed on the radially inner side of the lower half section of the carrier ring 2, and is configured to support the rotor shaft 11 from below. The first bearing pad 31 has a fan shape when seen along the axial direction of the carrier ring 2, and has an inner peripheral surface 31a and an outer peripheral surface 31b which are curved. The inner peripheral surface 31a of the first hearing pad 31 is formed by a bearing alloy, such as white metal, and is disposed so as to face a part of the rotor shaft 11, that is, the outer peripheral surface 12a of the journal 12.

Further, in some embodiments, a tilting unit (not shown) is disposed between the first bearing pad 31 and the carrier ring 2, and the first bearing pad 31 is supported to be capable of tilting.

Further, in some embodiments, the second bearing pad 32 is further provided.

The second bearing pad 32 is disposed on the radially inner side of the lower half section of the carrier ring 2 on the downstream side of the first beating pad 31 with respect to the rotational direction of the rotor shaft 11, and is configured to support the rotor shaft 11 from below, similarly to the first bearing pad 31. Similarly to the first bearing pad 31, the second bearing pad 32 has a fan shape when seen along the axial direction of the carrier ring 2, and has an inner peripheral surface 32a and an outer peripheral surface 32b which are curved. Similarly to the first bearing pad 31, the inner peripheral surface 32a of the second bearing pad 32 is formed by a bearing alloy such as white metal, and is disposed so as to face the outer peripheral surface 12a of the journal 12.

Further, in some embodiments, similarly to between the second bearing pad 32 and the carrier ring 2, a tilting unit (not shown) is disposed between the second bearing pad 32 and the carrier ring 2, and the second bearing pad 32 is supported to be capable of tilting.

Further, in some embodiments, a guide metal 33 is further provided.

The guide metal 33 is disposed on the radially inner side of the upper half region of the carrier ring 2, and is fixed to the carrier ring 2 with a bolt or the like (not shown). The guide metal 33 has a fan shape when seen along the axial direction of the carrier ring 2, and covers an upper region of the outer peripheral surface of the rotor shaft 11. The guide metal 33 has a bearing surface 33a on the inner side with respect to the radial direction of the carrier ring 2. The bearing surface 22a is curved along the upper region of the outer peripheral surface 12a of the journal 12, and faces the upper region of the outer peripheral surface 12a of the journal 12 via a bearing gap.

As shown in FIG. 2, in some embodiments, the journal bearing 1 includes a plurality of oil-supply unit (4, 5, 6) for supplying lubricant oil to the rotor shaft 11.

The plurality of oil-supply units (4, 5, 6) are disposed separated from one another in the circumferential direction, and are each capable of supplying lubricant oil to the rotor shaft 11. For instance, a manifold 24 is formed through the carrier ring 2, and lubricant oil is supplied to the plurality of oil-supply units (4, 5, 6) through the manifold 24.

The first oil-supply unit 4 is for supplying lubricant oil to a part of the rotor shaft 11, that is, the journal 12, and is disposed immediately before the first bearing pad 31, on the upstream side of the first bearing pad 31 with respect to the rotational direction of the rotor shaft 11. The first oil-supply unit 4 includes a plurality of nozzles 41, 42, that is, for instance, two nozzles 41, 42. The plurality of nozzles 41, 42 of the first oil-supply unit 4 are fixed with intervals immediately before and upstream of the first bearing pad 31.

Figure 4:
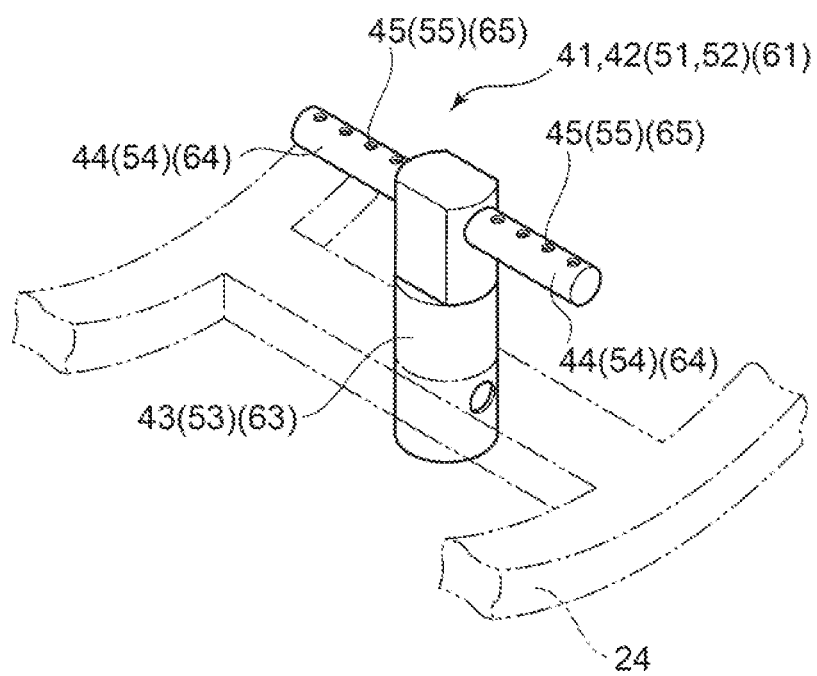
FIG. 4 is a schematic diagram of nozzles constituting a first oil-supply unit.

FIG. 4 is a schematic diagram of nozzles 41, 42 constituting the first oil-supply unit 4.

As shown in FIG. 4, the nozzles 41, 42 of the first oil-supply unit 4 include a base portion 43 and a branch portion 11. The base portion 43 has a cylindrical shape closed at the tip, is disposed along the radial direction of the carrier ring 2, and is fixed to the carrier ring 2 so as to be in communication with the manifold 24. The branch portion 44 has a cylindrical shape closed at the tip that is smaller than the cylindrical shape of the base portion 43, is disposed along the axial direction of the carrier ring 2, and is fixed to each side of the base portion 43 so as to be in communication with the interior space of the base portion 43. Further, the branch portion 44 includes a plurality of oil discharge holes 45 facing the axial center of the carrier ring 2.

Further, in some embodiments, the second oil-supply unit 5 is further provided.

As shown in FIG. 2, the second oil-supply unit 5 is for supplying lubricant oil to a part of the rotor shaft 11, that is, the journal 12, similarly to the first oil-supply unit 4, and is disposed on a circumferential directional position between the first bearing pad 31 and the second bearing pad 32.

Similarly to the first oil-supply unit 4, the first oil-supply unit 4 includes a plurality of nozzles 51, 52, that is, for instance, two nozzles 51, 52. The plurality of nozzles 51, 52 of the second oil-supply unit 5 are disposed with intervals on the circumferential directional positions between the first bearing pad 31 and the second bearing pad 32. The nozzles 51, 52 have the same configuration as the nozzles 41, 42 of the first oil-supply unit 4. Thus, herein, reference signs are associated with the corresponding base portion 53, branch portion 54, and oil discharge hole 55 in FIG. 4 to simplify the description.

With this configuration, lubricant oil is supplied to the gap between the rotor shaft 11 and the bearing pad 32 from the second oil-supply unit 5, and lubricant oil used in the first bearing pad 31 is replaced with the lubricant oil supplied from the second oil-supply unit 5. Accordingly, the second bearing pad 32 can lubricate the rotor shaft 11 with the lubricant oil supplied freshly from the second oil-supply unit 5.

Further, in some embodiments, the third oil-supply unit 6 is further provided.

Similarly to the first oil-supply unit 4 and the second oil-supply unit 5, the third oil-supply unit 6 is for supplying lubricant oil to the rotor shaft 11, that is, the journal 12, and is disposed immediately after the second bearing pad 32, on the downstream side of the second bearing pad 37 with respect to the rotational direction of the rotor shaft 11. While the third oil-supply unit 6 may include a plurality of nozzles, the third oil-supply unit 6 in the embodiment shown in FIG. 2 includes one nozzle 61. The nozzle 61 has the same configuration as the nozzle 41 of the first oil-supply unit 4. Thus, herein, reference signs are associated with the corresponding base portion 63, branch portion 64, and oil discharge hole 65 in FIG. 4 to simplify the description.

With this configuration, lubricant oil is supplied to the rotor shaft 11 from the third oil-supply unit 6, and lubricant oil that is carried over (supplied) to the first bearing pad 31 increases.

The pair of side plates 7, 7 are disposed on both end portions of the carrier ring 2 with respect to the axial direction along the outer periphery of the rotor shaft 11, thus defining both ends of the inner space of the journal bearing 1 in the axial direction of the carrier ring 2. The pair of side plates 7, 7 are each fixed to the carrier ring 2 with a bolt 71.

As shown in FIG. 1, in some embodiments, the journal bearing 1 uses a direct lubrication method. That is, the journal bearing 1 includes a gap between the inner peripheral surfaces of the respective side plates 7, 7 and the outer peripheral surface of a part of the rotor shaft 11, that is, the outer peripheral surface 12a of the journal 12, for bringing into communication the outside and a bearing interior space surrounded by the pair of side plates 7, 7. Thus, the interior space of the journal bearing 1 is not completely filled with lubricant oil. Instead, at least a part of the interior space of the journal bearing 1 is occupied by air that has entered from the outside. Further, the pressure of lubricant oil that exists inside the journal bearing 1 is similar to the atmospheric pressure.

In this regard, the journal bearing 1 of the above described direct lubrication method is different from a journal bearing of the oil-bath lubrication method whose bearing interior space is filled with lubricant oil. In the journal bearing of the oil-bath lubrication method, a seal member is provided between a side plate and a journal outer peripheral surface to prevent leakage of lubricant oil to outside from the bearing interior space, and the bearing interior space is filled with lubricant oil. Thus, the lubricant oil that exists in the interior space of the journal bearing of the oil-bath lubrication method has a higher pressure than the atmospheric pressure.

Herein, in the journal bearing 1 of the direct lubrication method, the oil-film thickness tends to become insufficient at a bearing pad (first bearing pad 31) positioned upstream with respect to the rotational direction of the rotor shaft 11. The reason thereof is considered to be shortage of lubricant oil that is carded over to the first bearing pad 31.

That is, in the journal bearing 1 of the direct lubrication method, lubricant oil is less likely to be carried over due to the head difference. In addition, a gap is provided between the inner peripheral surfaces of the respective side plates 7, 7 and the outer peripheral surface of the rotor shaft 11 for bringing into communication the outside and a bearing interior space surrounded by the pair of side plates 7, 7, and thus lubricant oil is likely to leak in the second region disposed above the first region. Thus, lubricant oil to be carried over to the first bearing pad 1 reduces, which leads to shortage of lubricant oil to be supplied to the first bearing pad 31. Particularly in a case where the surface pressure of the rotor shaft 11 on the first bearing pad 31 and the second bearing pad 32 is low, or in a case where the rotor shaft 11 rotates in a low rotation speed region, a smaller amount of lubricant oil is carried over to the first bearing pad 31, and the shortage of lubricant oil at the first bearing pad 31 is remarkable. When lubricant oil supplied to the first bearing pad 31 is insufficient, the first bearing pad 31 is not wet from the inlet and the generation region of the oil film pressure becomes narrow, which causes the oil film of the first bearing pad 31 to become thinner. Accordingly, in a case where the surface pressure of the rotor shall 11 on the first bearing pad 31 is low, or in a case where the rotor shaft 11 rotates in a low rotation speed region, the shaft center trajectory of the rotor shaft 11 may deviate from the vertical line and impair the isotropic nature of the journal bearing 1. On the other hand, if the oil amount of lubricant oil to be earned over to the first bearing pad 31 is excessively large, the stirring resistance of the rotor shaft 11 may also increase.

Thus, in some embodiments, as shown in FIGS. 5 to 8, the side plate 7 includes the first region A1, and the second region A2 disposed above the first region A. In the second region A2, the gap C2 between the inner peripheral surface 7a of the side plate 7 and the rotor shaft 11, that is, the outer peripheral surface 12a of the journal 12 is narrower than in the first region A1 (C2<C1).

In this case, lubricant oil is less likely to leak from between the rotor shaft 11 and the side plate 7 in the second region A2 disposed above the first region A1, whereby a sufficient lubricant oil is carried over (supplied) to the first bearing pad 31. In this way, even in a case where the surface pressure of the rotor shaft 11 on the first bearing pad 31 and the second bearing pad 32 is low, or in a case where the rotor shaft 11 rotates in a low rotation speed region, it is possible to ensure a sufficient oil film thickness on the first bearing pad 31. Furthermore, excess lubricant oil is discharged from between the rotor shaft 11 and the side plate 7 in the first region A1 having a wider gap than the second region A2, congestion of lubricant oil is prevented, and thereby it is possible to suppress an increase in the stirring resistance of the rotor shaft 11.

As shown in FIGS. 5 to 8, in some embodiments, the first region A1 of the side plate 7 extends in the circumferential direction, at least in the positional range between the first bearing pad 31 and the second bearing pad 32.

With this configuration, excess lubricant oil is discharged from the positional range between the first bearing pad 31 and the second bearing pad 32. In this way, it is possible to avoid congestion of lubricant oil between the first bearing pad 31 and the second bearing pad 32, and suppress an increase in stirring loss of the rotor shaft 11.

Figure 8:
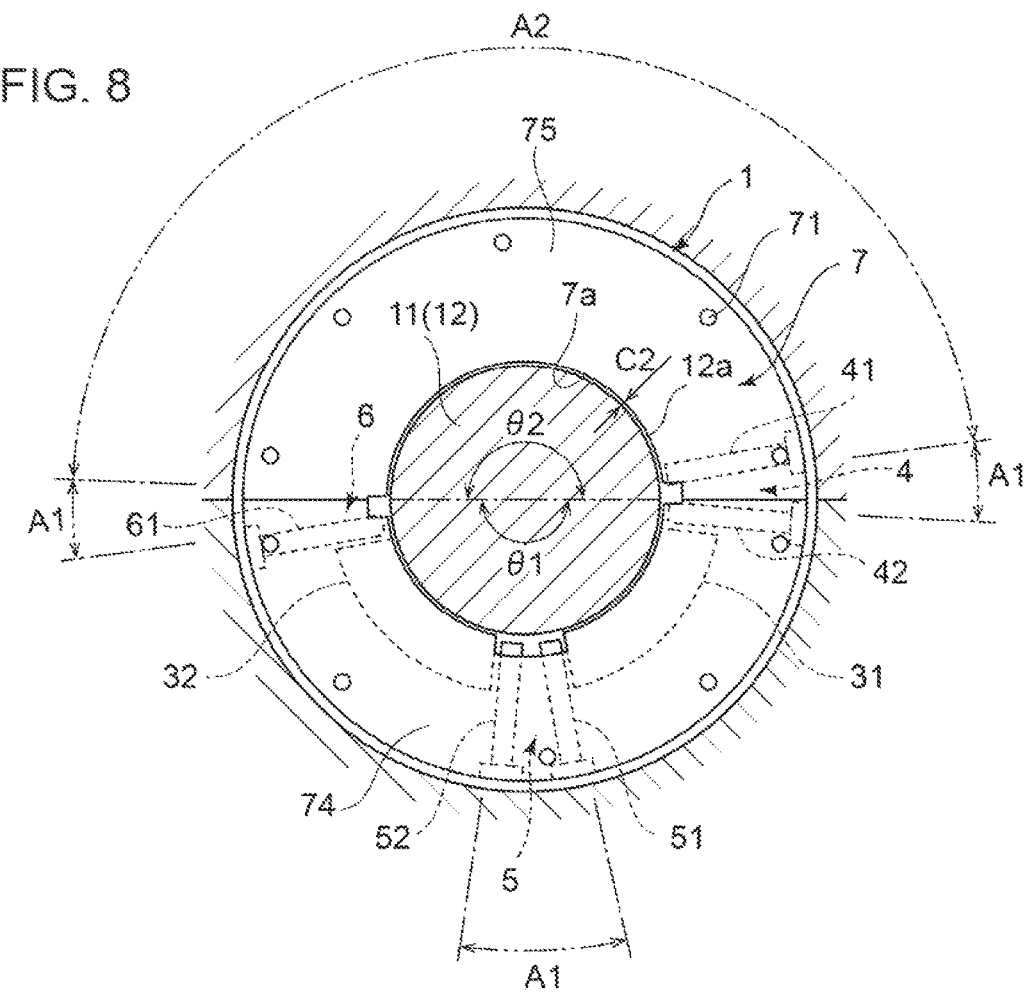
FIG. 8 is a schematic view of a journal beating according to an embodiment.

As shown in FIG. 8, in some embodiments, the first region A1 extends in the circumferential direction in at least one of the positional range between the guide metal 33 and the first bearing pad 31, or the positional range between the guide metal 33 and the second bearing pad 32, in addition to the positional range between the first bearing pad 31 and the second bearing pad 32.

With this configuration, excess lubricant oil is discharged from the positional range between the guide metal 33 and the first bearing pad 31, or from the positional range between the guide metal 33 and the second bearing pad 32. In this way, it is possible to avoid congestion of lubricant oil between the guide metal 33 and the first bearing pad 31 or between the guide metal 33 and the second bearing pad 32, and suppress an increase in stirring loss of the rotor shaft 11.

As shown in FIGS. 5 to 8, in some embodiments, the second region A2 of the side plate 7 extends in the circumferential direction, at least over the extending range of the guide metal 33.

With this configuration, lubricant oil is less likely to leak from the extending range of the guide metal 33, which makes it possible to promote carry over of lubricant oil effectively despite a head difference.

As shown in FIGS. 5 to 8, in some embodiments, at least one of the pair of side plates 7, 7 includes a lower half section 74 including the first region A1 and an upper half section 75 including the second region A2 and joined to the lower half section 74.

With this configuration, at least one of the pair of side plates 7, 7 has a divided structure, and thus it is possible to improve the assembling performance of the journal bearing 1.

As shown in FIGS. 5 to 8, in some embodiments, the lower half section 74 and the upper half section 75 have an arc shape centered at the rotor shaft 11. The central angle θ2 of the upper half section 75 is equal to or greater than the central angle θ1 of the lower half section 74 (θ2≥θ1).

With this configuration, lubricant oil is less likely to leak from the a range equal to or greater than the lower half section 74, which makes it possible to promote carry over of lubricant oil effectively despite a head difference.

Figure 5:
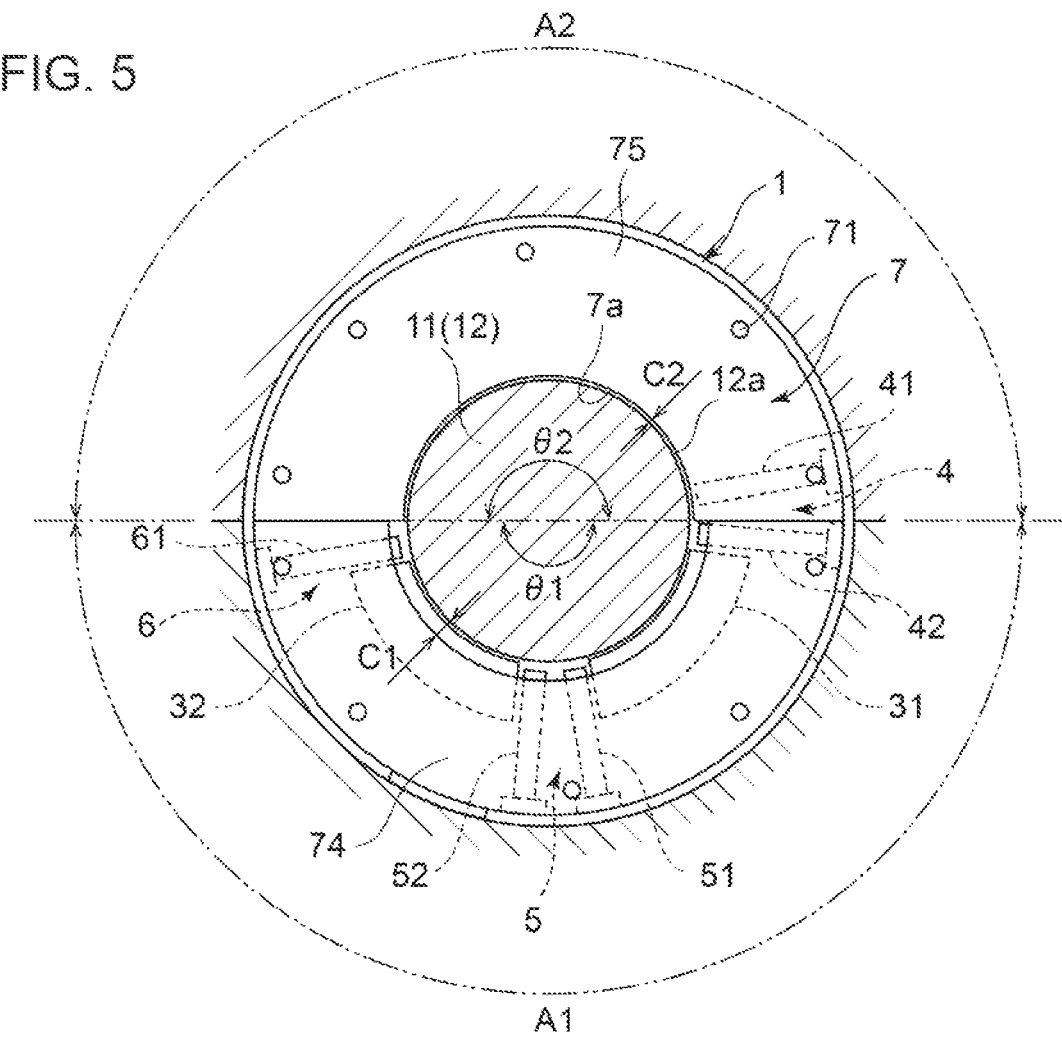
FIG. 5 is a schematic view of a journal bearing according to an embodiment.
Figure 7:
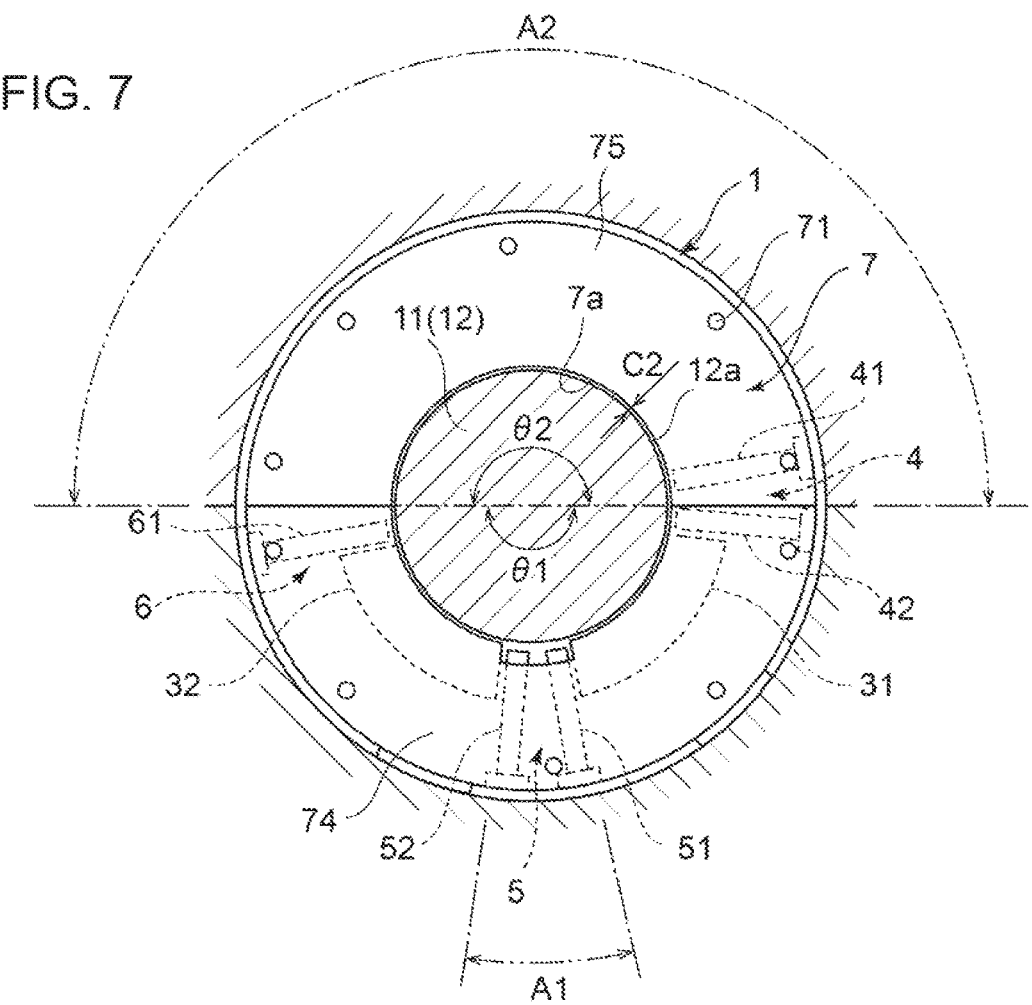
FIG. 7 is a schematic view of a journal bearing according to an embodiment.

As shown in FIGS. 5, 7, and 8, in some embodiments, the central angle of the upper half section 75 is 180 degrees, the second region A2 extends over the entire region of the circumferential directional range of the upper half section 75, and the first region A1 extends over the entire region of, the circumferential directional range of the lower half section 74.

With this configuration, it is possible to produce side plates 7 having gaps whose size varies between different circumferential directional positions easily, by preparing an upper half section 75 with a smaller gap and a lower half section 74 with a greater gap in advance, and joining the two sections via horizontal joining surfaces.

Figure 6:
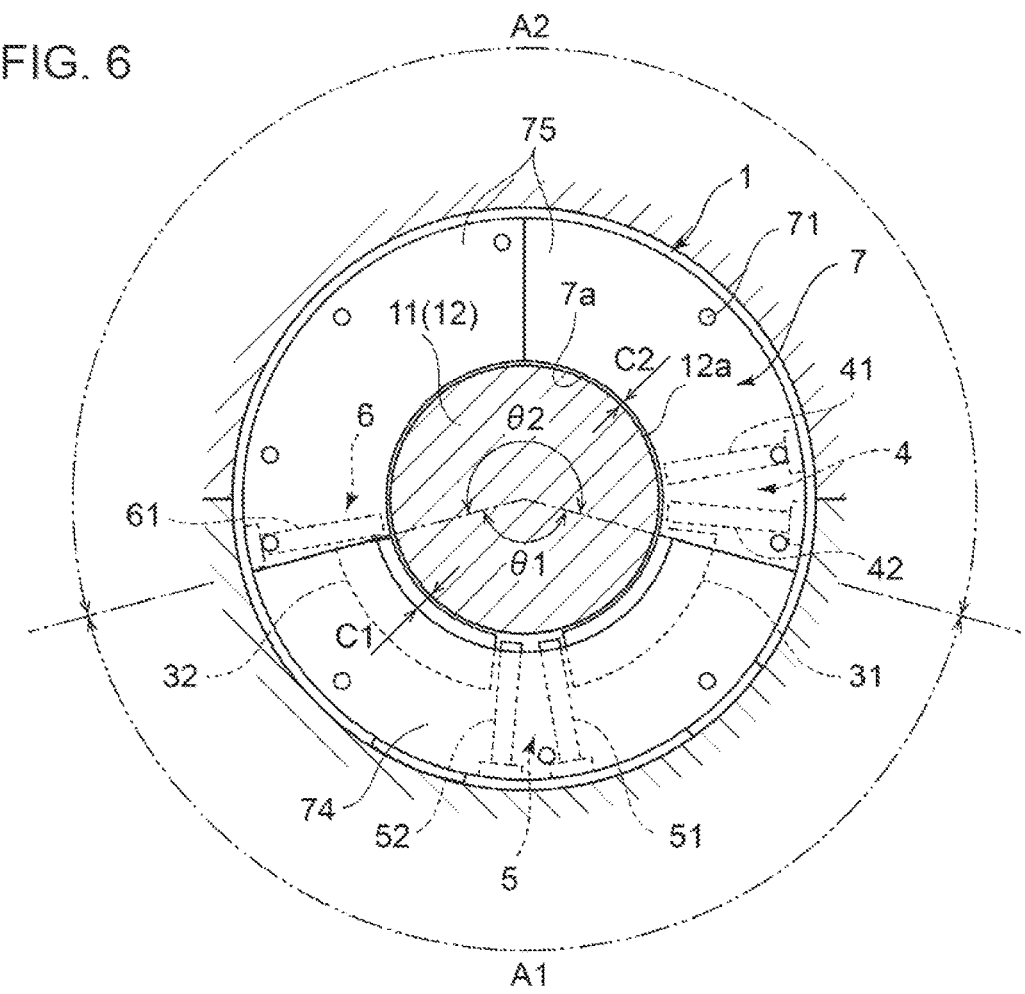
FIG. 6 is a schematic view of a journal bearing according to an embodiment.

As shown in FIG. 6, in some embodiments, the central angle θ2 of the upper half section 75 is greater than 180 degrees, and the upper half section 75 is dividable into two or more sections (θ2>θ1).

With this configuration, it is possible to provide an upper half section 75 having a structure than can be divided into two pieces or more.

As shown in FIG. 7, in some embodiments, the first region A1 of the side plate 7 is disposed only in the positional range between the first bearing pad 31 and the second bearing pad.

With this configuration, excess lubricant oil is discharged only from the positional range between the first bearing pad 31 and the second bearing pad 32. In this way, it is possible to avoid congestion of lubricant oil between the first bearing pad 31 and the second bearing pad 32, and suppress an increase in stirring loss of the rotor shaft 11.

Embodiments of the present invention were described in detail above, but the present invention is not limited thereto, and various amendments and modifications may be implemented.

DESCRIPTION OF REFERENCE NUMERALS

1 Journal bearing,
11 Rotor shaft
12 Journal
12a Outer peripheral surface
2 Carrier ring
24 Manifold
31 First bearing pad
31a Inner peripheral surface
31b Outer peripheral surface
32 Second bearing pad
32a Inner peripheral surface
32b Outer peripheral surface
33 Guide metal
33a Bearing surface
4 First oil-supply unit
41, 42 Nozzle
43 Base portion
44 Branch portion
45 Oil discharge hole
5 Second oil-supply unit
51, 52 Nozzle
53 Base portion
54 Branch portion
55 Oil discharge hole
6 Third oil-supply unit
61 Nozzle
63 Base portion
64 Branch portion
65 Oil discharge hole
7 Side plate
7a Inner peripheral surface
71 Bolt
74 Lower half section
75 Upper half section
A1 First region
A2 Second region
C1, C2 Gap
θ1, θ2 Central angle
H Housing
H1 Mount portion
H2 Cover
H3 Bolt

The invention claimed is:
1. A journal bearing, comprising:
a carrier ring having an annular shape;
a first bearing pad disposed on a radially inner side of a lower half region of the carrier ring and configured to support a rotor shaft from below;
a first oil-supply unit disposed immediately before and upstream of the first bearing pad;

a pair of side plates disposed on both end portions of the carrier ring with respect to an axial direction, along an outer periphery of the rotor shaft, wherein each of the side plates includes:
  a first region; and
  a second region which is positioned above the first region, wherein a gap between an inner peripheral surface of the side plate and an outer peripheral surface of the rotor shaft in the second region is narrower than a gap between the inner peripheral surface of the side plate and the outer peripheral surface of the rotor shaft in the first region.

2. The journal bearing according to claim 1,
further comprising a second bearing pad disposed on the radially inner side of the lower half region of the carrier ring, on a downstream side of the first bearing pad with respect to a rotational direction of the rotor shaft, and configured to support the rotor shaft from below, and
wherein the first region of the side plates extends in a circumferential direction at least in a positional range between the first bearing pad and the second bearing pad.

3. The journal bearing according to claim 2,
further comprising a second oil-supply unit disposed on a circumferential-directional position between the first bearing pad and the second bearing pad.

4. The journal bearing according to claim 2,
further comprising a guide metal disposed on a radially inner side of an upper half region of the rather ring, the guide metal covering an upper region of the outer peripheral surface of the rotor shaft,
wherein the first region of the side plate extends in the circumferential direction in at least one of a positional range between the guide metal and the first bearing pad or a positional range between the guide metal and the second bearing pad, in addition to the positional range between the first bearing pad and the second bearing pad.

5. The journal bearing according to claim 2,
further comprising a third oil-supply unit disposed downstream of the second bearing pad.

6. The journal bearing according to claim 1,
further comprising a guide metal disposed on a radially inner side of an upper half region of the carrier ring, the guide metal covering an upper region of the outer peripheral surface of the rotor shaft,
wherein the second region of the side plate extends in a circumferential direction at least over an extending range of the guide metal.

7. The journal bearing according to claim 1,
wherein at least one of the pair of side plates includes a lower half section including the first region and an upper half section including the second region, the upper half section being joined to the lower half section.

8. The journal bearing according to claim 7,
wherein the lower half section and the upper half section have an arc shape centered at the rotor shaft, and
where a central angle of the upper half section is equal to or greater than a central angle of the lower half section.

9. The journal bearing according to claim 8,
wherein the central angle of the upper half section is 180 degrees,
wherein the second region extends over an entire region of a circumferential-directional range of the upper half section, and
wherein the first region extends over an entire region of a circumferential-directional range of the lower half section.

10. The journal bearing according to claim 8,
wherein the central angle of the upper half section is greater than 180 degrees, and
wherein the upper half section is configured to be dividable into two or more sections.

11. A rotary machine, comprising:
a journal bearing according to claim 1; and
a rotor shaft supported by the journal bearing.

* * * * *